(12) United States Patent
Hammerum et al.

(10) Patent No.: US 11,002,248 B2
(45) Date of Patent: May 11, 2021

(54) CONTROL SYSTEM FOR A WIND TURBINE COMPRISING A BLADE CONTROLLER FOR EACH BLADE OF THE WIND TURBINE

(71) Applicant: VESTAS WIND SYSTEMS A/S, Aarhus (DK)

(72) Inventors: Keld Hammerum, Hadsten (DK); John Bengtson, Aarhus (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 361 days.

(21) Appl. No.: 16/077,685

(22) PCT Filed: Feb. 8, 2017

(86) PCT No.: PCT/DK2017/050029
§ 371 (c)(1),
(2) Date: Aug. 13, 2018

(87) PCT Pub. No.: WO2017/140316
PCT Pub. Date: Aug. 24, 2017

(65) Prior Publication Data
US 2019/0072071 A1 Mar. 7, 2019

(30) Foreign Application Priority Data
Feb. 16, 2016 (DK) .............. PA201670084

(51) Int. Cl.
*F03D 7/02* (2006.01)
*F03D 7/04* (2006.01)

(52) U.S. Cl.
CPC .......... *F03D 7/0224* (2013.01); *F03D 7/047* (2013.01); *F05B 2260/76* (2013.01);
(Continued)

(58) Field of Classification Search
CPC .......................... F03D 7/047; F05D 2260/76
See application file for complete search history.

(56) References Cited

U.S. PATENT DOCUMENTS

| 4,352,634 A | 10/1982 | Andrews |
| 8,487,460 B2 * | 7/2013 | Krueger ............... F03D 7/0264 290/44 |

(Continued)

FOREIGN PATENT DOCUMENTS

| CN | 101487448 A | 7/2009 |
| CN | 101839216 A | 9/2010 |

(Continued)

OTHER PUBLICATIONS

International Search Report for Application No. PCT/DK2017/050029 dated Apr. 5, 2017.

(Continued)

*Primary Examiner* — David E Sosnowski
*Assistant Examiner* — Danielle M. Christensen
(74) *Attorney, Agent, or Firm* — Patterson + Sheridan, LLP

(57) ABSTRACT

The present invention relates to control of a wind turbine, and in particular it relates to a distributed control system including a blade controller for each blade of the wind turbine. The electrical connection between each blade controller and the power supply of the blade controller is arranged to be functionally isolated from the electrical connection of each other blade controller and the power supply of the respective blade controllers.

16 Claims, 4 Drawing Sheets

(52) U.S. Cl.
CPC ..... *F05B 2260/79* (2013.01); *F05B 2270/107* (2013.01); *F05B 2270/602* (2013.01); *Y02E 10/72* (2013.01)

(56) References Cited

U.S. PATENT DOCUMENTS

| | | | |
|---|---|---|---|
| 2008/0118354 A1* | 5/2008 | Jeppesen | F03D 7/0224 |
| | | | 416/1 |
| 2008/0290664 A1 | 11/2008 | Kruger | |
| 2010/0138060 A1* | 6/2010 | Gao | F03D 17/00 |
| | | | 700/287 |
| 2011/0229300 A1 | 9/2011 | Kanev et al. | |
| 2014/0127014 A1 | 5/2014 | Vilbrandt et al. | |
| 2016/0003220 A1 | 1/2016 | Warfen et al. | |

FOREIGN PATENT DOCUMENTS

| | | |
|---|---|---|
| CN | 103266986 A | 8/2013 |
| CN | 103541862 A | 1/2014 |
| WO | 2011104318 A1 | 9/2011 |
| WO | 2017140316 A1 | 8/2017 |

OTHER PUBLICATIONS

Danish 1st Techincal Examination for Application No. PA 2016 70084 dated Jul. 15, 2016.
Written Opinion of the International Searching Authority for Application No. PCT/DK2017/050029.
Chinese Office Action for Application No. 201780023649.7 dated Aug. 5, 2020.
Chinese Office Action for Application No. 201780023649.7 dated Sep. 2, 2019.

* cited by examiner

CONTROL SYSTEM FOR A WIND TURBINE COMPRISING A BLADE CONTROLLER FOR EACH BLADE OF THE WIND TURBINE

FIELD OF THE INVENTION

The present invention relates to control of a wind turbine, and in particular it relates to a distributed control system including a blade controller for each blade of the wind turbine.

BACKGROUND OF THE INVENTION

Modern wind turbines are controlled and regulated continuously with the purpose of ensuring optimal power extraction from the wind under the current wind, and weather, while at the same time ensuring that the loads on the different components of the wind turbine are at any time kept within acceptable limits, and while respecting any externally set operational constraints. Based on this and following some control strategy, control parameters of the turbine are continuously determined in order to perform optimally under the given conditions.

When designing a wind turbine the loads experienced by the turbine in extreme situations need to be taken into account, such extreme situation include extreme weather conditions such as gust and storms, turbine operation with a faulty component, shutdown, etc. In this regard, the forces acting on a modern megawatt turbine as a result of a fault can be quite extreme. One example is the asymmetric forces that may arise if the pitch system of one blade breaks down. Another example is loss of generator torque during operation.

In order to take such potential loading scenarios into account when designing the wind turbine several strategies may be applied. One simple solution is simply building the turbine strong enough, e.g. use sufficient steel in the tower, a sufficient large fundament, a sufficient large main bearing, etc. to withstand a worse case loading situation. This solution is however quite expensive. In alternative less expensive strategies, proper design of the control system and other system elements can be made to mitigate identified extreme loading scenarios, and thereby allow use of less steel in the tower as well as smaller and lighter components in general.

It is against this background that the invention has been devised.

SUMMARY OF THE INVENTION

It would be advantageous to achieve a control system for a wind turbine which on one hand reduces risk of faults with load implications, and on the other hand support that should a fault with a load implication occur, that this fault can be handled in a well-defined manner.

Accordingly, in a first aspect, there is provided a control system for a wind turbine comprising two or more blades, the control system comprises a blade controller for each blade of the wind turbine and a central controller, wherein each blade controller is arranged for controlling the pitch angle of the blade to which it is assigned, and each blade controller being electrically connected to a power supply; wherein the electrical connection between each blade controller and the power supply of the blade controller is functionally isolated from the electrical connection of each other blade controller and the power supply of the respective blade controllers.

The control system provides independence between loss of torque on the drive train and loss of pitch control function, and at the same time ensures that an electrical fault on one blade controller does not cause a fault on any other blade controller, and thereby ensuring that if a loss of pitch control function occurs, this loss is only occurring at one blade at the time. In this manner, the probability of loss of torque on the drive train and loss of pitch control function on more than one blade can be reduced to a very low level. This has the advantageous consequence that the required structural strength of the wind turbine tower and other components may be designed accordingly, i.e. reduced, which leads to a more cost efficient wind turbine.

In a second aspect, there is provided a wind turbine with a control system according to the first aspect. In an embodiment, the control system is implemented in the wind turbine as a distributed control system where the blade controllers are positioned in the hub.

Placing the blade controllers are positioned in the hub provides robustness towards failures in the transmission of signals across the rotating hub/nacelle interface. That is, full pitch control may be retained if this interface fails.

In general the aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
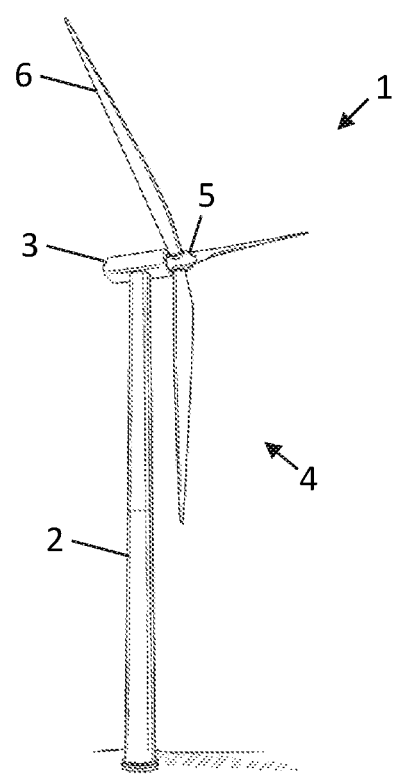
FIG. 1 illustrates, in a schematic perspective view, an example of a wind turbine.

FIG. 1 illustrates, in a schematic perspective view, an example of a wind turbine 1. The wind turbine 1 includes a tower 2, a nacelle 3 disposed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle or distributed at a number of locations inside (or externally to) the turbine and communicatively connected.

Figure 2:
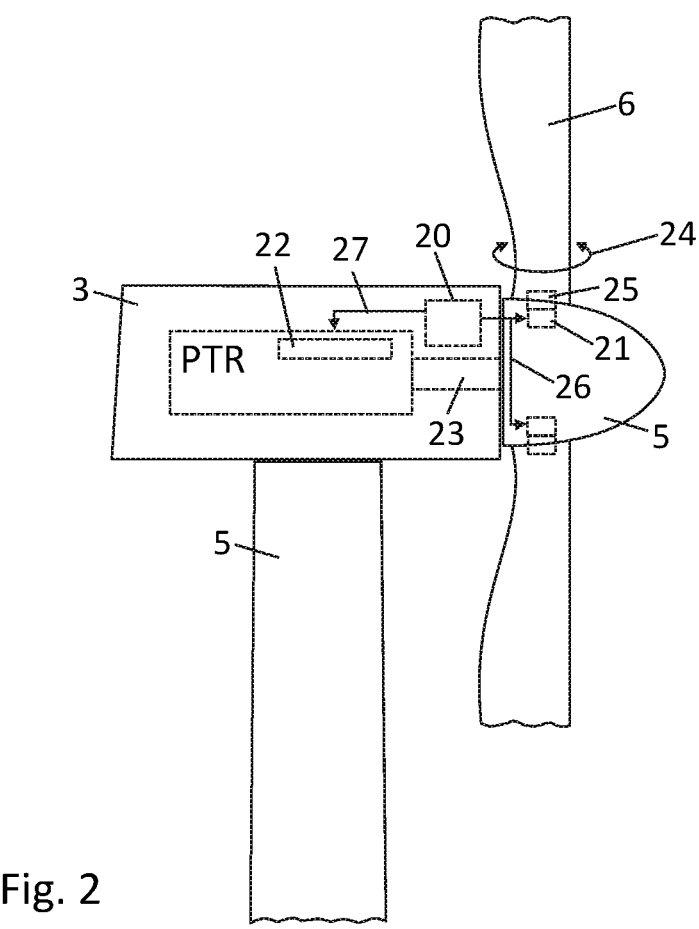
FIG. 2 schematically illustrates elements of a control system in accordance with embodiments of the present invention.

FIG. 2 schematically illustrates an embodiment of elements of a control system 20, 21, 22 together with further elements of a wind turbine. The wind turbine comprises rotor blades 6 which are mechanically connected to a power train PTR via an axle 23. The power train is not shown in detail, but includes an electrical generator, optionally a gearbox, and an electrical converter. The electrical power generated by the generator is injected into a power grid via the electrical converter. The electrical generator and the converter may be based on a full scale converter (FSC) architecture or a doubly fed induction generator (DFIG) architecture, but other types may be used.

The control system comprises a number of elements, including at least one central controller 20 with a processor and a memory, so that the processor is capable of executing computing tasks based on instructions stored in the memory. In general, the wind turbine controller ensures that in operation the wind turbine generates a requested power output level. This is obtained by adjusting the pitch angle 24 and/or the power extraction of the converter. To this end, the control system comprises a blade controller 21 for each blade. The blade controller is part of a pitch actuation system, which comprises a pitch actuator 25 such as a hydraulic actuating system or an electrical actuating system. The pitch angle is set based on a determined pitch reference 26. The power train includes or is connected to a power controller 22 which based on a power reference 27 and other values control the generator and/or converter.

The rotor blades may be pitched using a common pitch system which adjusts all pitch angles on all rotor blades at the same time, as well as in addition thereto an individual pitch system which is capable of individual pitching of the rotor blades. The control system is illustrated to comprise a central controller 20 positioned in the nacelle and one blade controller 21 for each blade positioned in the hub close to the blade to which it is assigned. However more elements of the control system may be present, both in the nacelle and the hub, but also in the tower as well as in a power plant controller (not shown).

Figure 3:
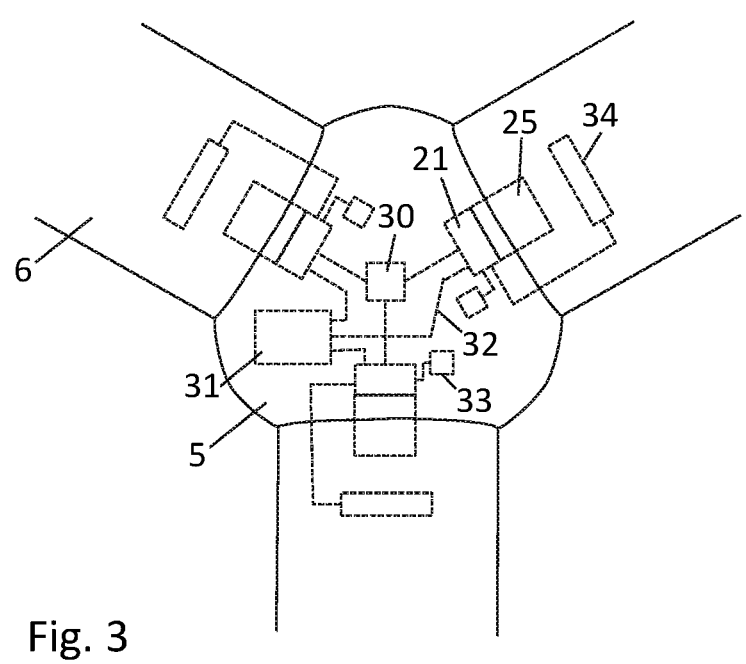
FIG. 3 schematically illustrates a front view of a hub together with bottom section of blades.

FIG. 3 schematically illustrates a front view of a hub 5 together with bottom section of blades 6. FIG. 3 further illustrates blade controllers 21 for each blade of the wind turbine. The blade controllers are communicative coupled to a central controller via a rotational transmission between the hub and the nacelle. In the illustrated embodiment each blade controller is connected to a communication unit 30, such as a switching unit or network switch, which ensures communication between the central controller and possibly other units and each of the blade controllers, as well as between the blade controllers.

The figure moreover illustrates a power supply unit 31 electrically connected to each blade controller. The electrical connection 32 between each blade controller 21 and the power supply 31 of the blade controller is functionally isolated from the electrical connection of each other blade controller and the power supply of the respective blade controllers. In this manner, any electrical fault occurring on a blade controller or the power supply of a blade controller does not propagate to any other blade controller or power supply of any other blade controller.

Figure 4:
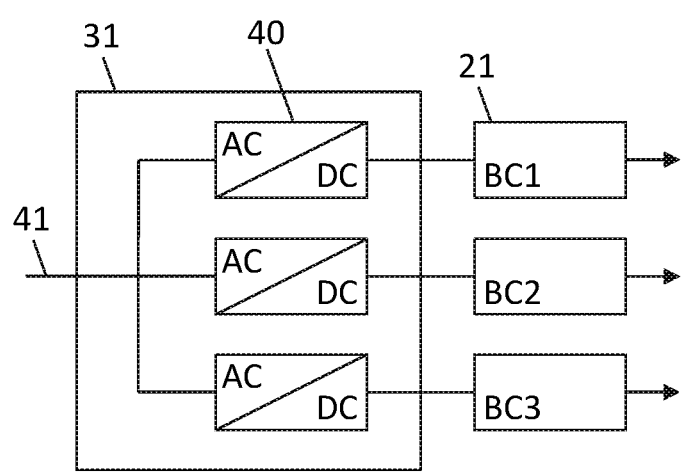
FIGS. 4 to 6 illustrate embodiments of functional isolation of the electrical connections between each blade controller and the power supply of the blade controller.
Figure 5:
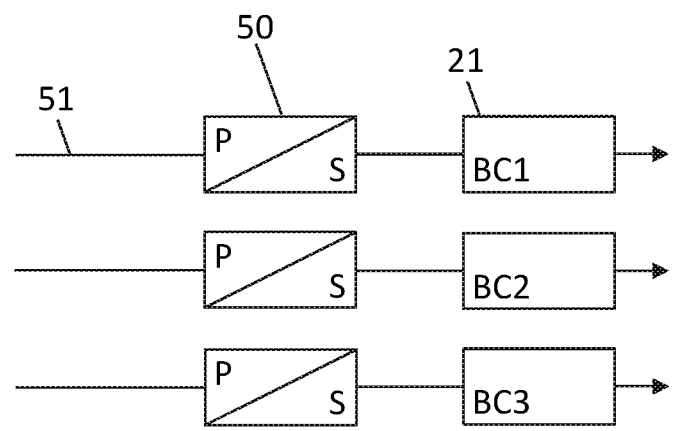
Figure 6:
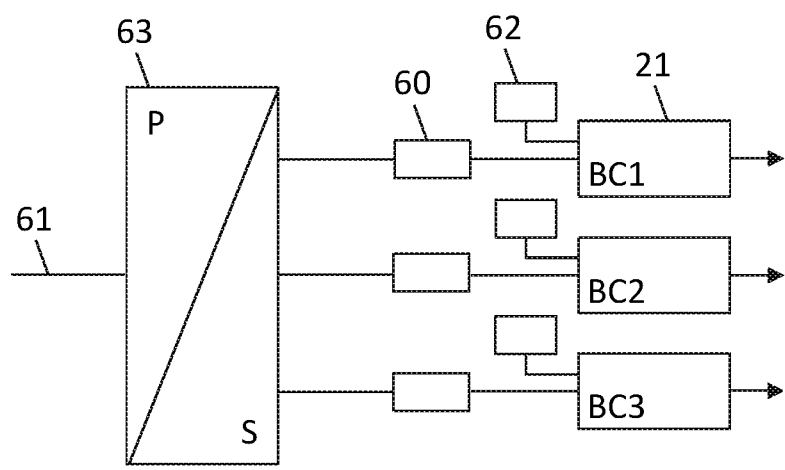

Functionally isolating the electrical connection between each blade controller and the power supply of the blade controller achieves domain separation of each blade controller. FIGS. 4 to 6 illustrate embodiments of such domain separation. While three embodiments are illustrated, it is to be understood that more and different implementations may be available to the skilled person for providing domain separation, and the invention is not limited to the shown examples.

FIG. 4 schematically illustrates an embodiment of a power supply arrangement 31 where each blade controller 21, BC1-BC3 is fed by a dedicated DC supply output from an AC to DC supply 40. In the illustrated embodiment, a common AC supply line 41 is provided to the hub, and the functionally isolation is provided by the AC to DC transformers. In an embodiment, the AC voltage may be in the range of 230 V to 480 V, however any voltage available in the turbine may be used by an appropriate AC to DC transformer. The DC voltage may be in the range of 5 V to 48 V, but again any voltage required by the blade controllers may be supplied by an appropriate AC to DC transformer.

In an embodiment the functionally isolation is provided by a galvanic isolation between each blade controller. The galvanic isolation is provided by the AC to DC transformer, and may be provided in any appropriate manner, as is known to the skilled person.

FIG. 5 schematically illustrates a general embodiment of a power supply arrangement where each blade controller 21, BC1-BC3 is fed by a dedicated supply line 51 which comprises an electrical unit 50 which has a primary side P and a secondary side S. The dedicated supply line may be supplied from a power source which ensures functional separation between the supply lines 51 for the blade controllers, in this case the function of the electrical unit 50 is to generate a dedicated power supply output voltage suitable for the blade controller. If the dedicated supply line is not supplied from a power source which ensures functional separation between the supply lines 51, the function of the electrical unit 50, in addition to generate an output voltage suitable for the blade controller, is also to provide a domain separation between the blade controllers, such as by a galvanic separation.

FIG. 6 schematically illustrates an embodiment of a power supply arrangement 63 where each blade controller 21, BC1-BC3 is fed by a common supply 61 which has a primary side P and a secondary side S, this may e.g. be an AC to DC supply or a second level DC to DC supply. Moreover, each supply line comprises an electrical element 60 which ensures functional separation between the blade controllers, such as galvanic separation elements which provided DC to DC galvanic separation. In this embodiment, a battery supply 62 is provided for each blade controller to provide a redundant power supply which ensures that power is not lost on all blade controllers if the common supply fails. The galvanic separation element 60 may in embodiment also be built into the blades controllers.

While FIG. 6 illustrates an embodiment with a redundant power supply 62, a redundant power supply may be more generally utilized to provide a further power supply. Another example where each blade controller further comprises a redundant power supply is provided in FIG. 3 where each blade controller is connected to a battery backup 33 for redundant power supply to mitigate a fault occurring on the power supply unit 31.

Figure 7:
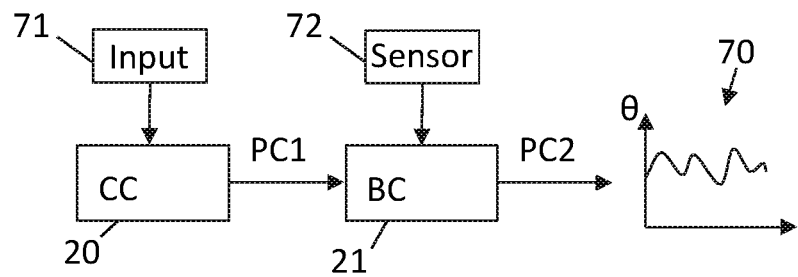
FIG. 7 illustrates embodiments of the functionality of the control system.

FIG. 7 illustrates embodiments of implemented functionality of the control system.

An important function of the blade controller 21, BC is to control the pitch angle 24 of the blade to which it is assigned.

In an embodiment the functioning of the blade controller is to handle faults. In such embodiment each blade controller may be arranged to receive a pitch command PC1 from the central controller 20, CC and validate the received pitch command. Upon a valid pitch command from the central controller the received pitch command is used as the pitch command for the blade, that is the received pitch command PC1 is forwarded to the blade actuator as PC2, and the blade actuator ensures to set the pitch angle accordingly 70.

In an embodiment, the validation may be a check to determine that a pitch command is actually received. It may be a check to determine that a change in the pitch command as compared to previously received pitch commands are within acceptable limits, for example a pitch command may be compared to a continuously updated pitch trajectory. Other examples include comparing the received pitch command with received pitch command(s) for other blade controllers. It may be determined if the pitch command is correct according to the communication protocol. The blade controller may use a model calculation to determine an effect of the pitch command and only as a result of an acceptable effect validate the pitch command. The effect may be such effects as an estimated loading. In general, it may be within the abilities of the skilled person to set up criteria for when a pitch command is valid or not.

In a situation where a non-valid pitch command is received, the blade controller is arranged to determine a pitch command for the blade. Examples of this are disclosed in connection with FIG. 8 when discussing the fault modes F1 and F2.

In an embodiment, each blade controller may be arranged to receive a pitch command PC1 from the central controller CC and modify the pitch command and use the modified pitch command for controlling the pitch of the blade. In this situation, the pitch command PC2 is different from the pitch command PC1.

In one embodiment, the blade controller is arranged to receive a collective pitch command which is based on the wind speed, the aerodynamics of the rotor, the operational state of the turbine, etc. The blade controller super-imposes a further pitch response onto the collective pitch command, such as load mitigating pitch response or a vibration damping pitch response, or any other additional pitch responses where individually set pitch angle can be used to achieve a given objective.

In general, the central controller CC uses various inputs 71 in order to determine a pitch command PC1. Also the blade controller(s) may receive sensor input(s) 72. Having access to sensor input, the pitch command PC2 for a blade may be determined based on the sensor input.

In general the blade controller may be equipped with a certain computing power. To this end, each of the blade controllers may comprise a processor and a memory for carrying out the functionality of embodiments of the present invention. The computing power may at least be so that each blade controller is capable of calculating a pitch set-point for the blade to which the controller is assigned. The pitch set-point may be calculated based on input.

In an embodiment, the sensor inputs 72 may be such input as blade root moments for use in connection with load mitigating individual pitching, blade vibration sensors for use in blade vibration mitigating actions, tower accelerations sensors for use in tower damping, etc. Moreover, the input sensor 72 may also by virtual sensor inputs, where various sensor inputs and a turbine model is used to calculate inputs at positions which are not covered by a physical sensor, such as an angle of attack sensor. In further embodiments, the sensor input may be azimuthal position of the rotor, rotor speed measured either the low speed axis and/or the high speed axis, etc. An example of a sensor connected to the blade controllers 21 is provided in FIG. 3, where root moment sensors 34 are shown for each blade.

In an embodiment, each blade controller is arranged to determine if at least one blade controller is in a fault mode. The at least one blade controller may be the controller itself or any other controller.

In an embodiment, the controller may determine that any other controller is in a fault mode by receiving a fault signal via a communication network 30. This may be implemented by broadcasting a fault command on the communication network 30 upon detecting a fault or entering a fault mode. However, in an embodiment, the determination of at least one other blade controller being in a fault mode may be determined by the blade controller without being in communicative contact with the least one other blade controller, i.e. in a situation where the communication network is lost or faulty. This may be obtained by use of the communication network by broadcasting no-fault commands on the network at regular intervals during normal operation. In an event that such no-fault commands is stopped from a given blade controller, it can be assumed that the blade controller is in a fault mode. In an embodiment, the registering that no-fault commands is broadcast can be combined with earlier received messages to deduce a given fault mode of the blade controller.

Figure 8:
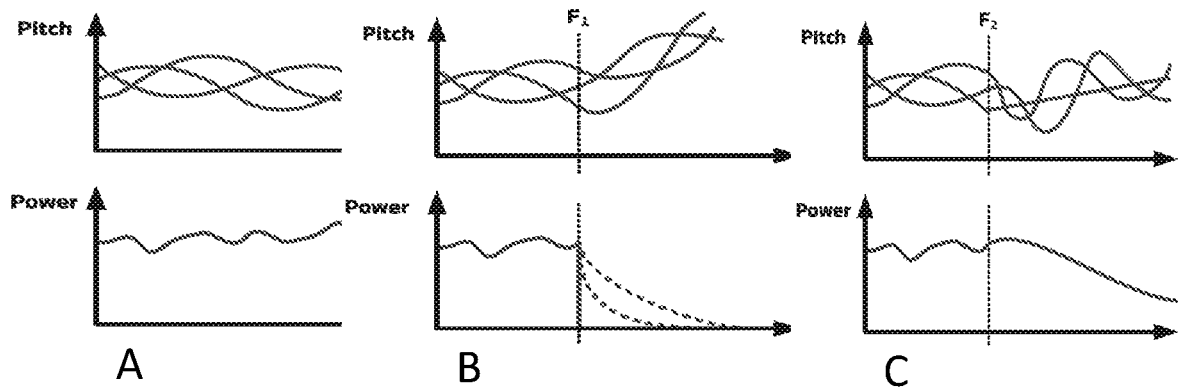
FIG. 8 illustrates examples of predefined fault scenarios

FIG. 8 illustrates examples of predefined fault scenarios, here termed F1 and F2 illustrated in FIGS. 8B and 8C, respectively.

In a situation where it is determined that a blade controller is in a fault mode, each blade controller may be provided with a number of predefined fault scenarios. Upon determination if at least one blade controller is in a fault mode, the predefined fault scenarios may be used to classify the fault mode of the at least one blade controller to be one of the predefined fault scenarios.

In an embodiment, each predefined fault scenario may have a pitch strategy associated to it which is used for control of the blade in the fault mode.

FIG. 8A illustrates a normal operation situation where power is generated at a given level, and where individual pitch control is used for compensating asymmetric loading of the rotor.

In FIG. 8B a first fault scenario F1 is occurring. In this fault scenario more or less abrupt removal of the generator torque has occurred. The fault mode is set to F1 and each blade controller uses the associated pitch strategy which in the shown example is a combination of pitching out of the wind to avoid excessive rotor speed and individual pitching to keep control of the asymmetric loading of the rotor.

In FIG. 8C a second fault scenario F2 is occurring. In this fault scenario a fault is occurring at one of the blade. The fault mode is set to F2 and each blade controller uses the associated pitch strategy which in the shown example is different for the failing blade and the two operating blades. Again, however a general pitching out of the wind is done to avoid excessive rotor speed. The failing blade pitch out using a safe state of constant pitching, e.g. obtained by a mechanical arrangement, whereas the two other blades continue with a modified individual pitch control scheme to retain compensation for asymmetric rotor loads. In connection with the individual pitching of the two working blades, the pitch position of the failing blade may be taken into account. The power slowly ramp down together with the rotor speed.

FIG. 8C illustrates a constant pitch out of the failing blade. Such constant pitching may be implemented as a fail-to-safe mode which is executed upon determination of at least some fault modes of the blade controllers.

In general, each controller may have a fail-to-safe mode implemented.

In a control system, faults may have a number of origins and may broadly be classified into hardware faults, such as failing electronics and electrics, and software fault resulting from inadequate code. One manner in which the risk of faults can be reduced is to design the system in accordance with safety standards, such as the safety-related standards for control systems ISO 13849, IEC 61508 and IEC 62061.

In an embodiment each blade controller is arranged in a safe domain. This means that each blade controller has been designed and programmed in accordance with a specified safety standard, and certified by a certification body to comply with the standard.

In addition to arranging the blade controllers in a safe domain, also sensors arranged for providing input may be arranged in a safe domain. In general, the blade controller may use input from both sensors arranged in a safe domain, and sensors not arranged in a sensor domain.

In general, a component or arrangement, such as a controller or a sensor may be certified to a certain safety performance levels (PL) or safety integrity level (SIL). Such safety levels are technically well-defined since they are defined in accordance with well-defined technical criteria.

In an embodiment, a blade controller and or a sensor, may be certified to a performance level which ensures that the risk of control failure on more than one blade at a time is less than $10^{-6}$ per hour, corresponding to a performance level of SIL class 2 in accordance with IEC 62061:2006. For such safety level operation of the blade controller may be referred to as continuous mode in accordance with the terminology of the IEC 62061 standard.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A control system for a wind turbine comprising two or more blades, the control system comprising a blade controller for each blade of the wind turbine and a central controller, wherein each blade controller is arranged for:
   receiving a first pitch command from the central controller;
   determining whether the pitch command is valid;
   controlling a pitch angle of the blade to which the blade controller is assigned using the first pitch command upon determining that the first pitch command is valid; and
   determining a second pitch command for the blade to which the blade controller is assigned upon determining that the first pitch command is invalid, wherein each blade controller is electrically connected to a power supply, and wherein the electrical connection between each blade controller and the respective power supply of the blade controller is functionally isolated from the electrical connection of each other blade controller and their respective power supply.

2. The control system according to claim 1, wherein the functional isolation is provided by a galvanic isolation between each blade controller.

3. The control system according to claim 1, wherein the functional isolation is provided by a dedicated power supply to each blade controller, the dedicated power supply being electrical separated from each other dedicated power supply.

4. The control system according to claim 1, wherein the power supply of each blade controller further comprises a redundant power supply.

5. The control system according to claim 1, wherein each blade controller is arranged to modify the first pitch command and use the modified pitch command for controlling the pitch of the blade.

6. The control system according to claim 1, wherein each blade controller is arranged to receive sensor input, and wherein the pitch command for the blade is determined based on the sensor input.

7. The control system according to claim 1, wherein each blade controller is arranged to determine if at least one blade controller is in a fault mode.

8. The control system according to claim 1, wherein a determination of at least one other blade controller being in a fault mode is determined by the blade controller without being in communicative contact with the least one other blade controller.

9. The control system according to claim 1, wherein each blade controller is provided with a number of predefined fault scenarios, and upon determination if at least one blade controller is in a fault mode, determine the fault mode of the at least one blade controller to be one of the predefined fault scenarios.

10. The control system according to claim 9, wherein each predefined fault scenario has an associated pitch strategy, and wherein upon determination of the at least one other blade controller to be one of the predefined fault scenarios, base the control of the blade on the associated pitch strategy.

11. The control system according to claim 1, wherein each blade controller includes a fail-to-safe mode, and upon determination if at least one blade controller is in a fault mode, control the blade in accordance with the fail-to-safe mode.

12. The control system according to claim 1, wherein each blade controller is arranged in a safe domain.

13. The control system according to claim 1, wherein each blade controller is arranged to receive sensor input, and wherein the pitch command for the blade is determined based on the sensor input, wherein the sensor is arranged in a safe domain.

14. A wind turbine comprising a rotor with two or more blades and a hub, a power generation system driven by the rotor, a nacelle for housing the power generating system, and a rotor blade pitch actuation system for adjusting the pitch angle of the blade, wherein the wind turbine further comprises a control system, the control system comprises a blade controller for each blade of the wind turbine and a central controller, wherein each blade controller is arranged for:
   receiving a first pitch command from the central controller;
   determining whether the pitch command is valid;
   controlling a pitch angle of the blade to which the blade controller is assigned using the first pitch command upon determining that the first pitch command is valid; and
   determining a second pitch command for the blade to which the blade controller is assigned upon determining that the first pitch command is invalid, wherein each blade controller is electrically connected to a power supply, and wherein the electrical connection between each blade controller and the power supply of the blade controller is functionally isolated from the electrical connection of each other blade controller and the power supply of the respective blade controllers.

15. The wind turbine according to claim 14, wherein the control system is a distributed control system where at least the blade controller for each blade of the wind turbine is positioned in the hub.

16. A method for controlling a plurality of blades of a wind turbine, comprising:
- receiving, by a blade controller of the plurality of blade controllers, first pitch commands from a central controller communicatively coupled to the plurality of blade controllers, wherein a respective one of the plurality of blade controllers is configured to control a pitch angle of a respective one of the plurality of blades, each blade controller being electrically connected to a power supply, and wherein the electrical connection between each blade controller and the respective power supply of the blade controller is functionally isolated from the electrical connection of each other blade controller and their respective power supply;
- determining, by the blade controller, whether the first pitch command is valid;
- controlling a pitch angle of the blade to which the blade controller is assigned using the first pitch command upon determining that the first pitch command is valid; and
- determining a second pitch command for the blade to which the blade controller is assigned upon determining that the first pitch command is invalid.

* * * * *